United States Patent
Johnson et al.

(10) Patent No.: US 6,292,855 B1
(45) Date of Patent: Sep. 18, 2001

(54) METHOD TO ALLOW HARDWARE CONFIGURABLE DATA STRUCTURES

(75) Inventors: Russell A. Johnson; Andrew C. Brown; Stephen B. Johnson, all of Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/217,974

(22) Filed: Dec. 18, 1998

(51) Int. Cl.[7] .............................. G06F 12/10; G06F 17/30
(52) U.S. Cl. ............................... 710/33; 710/22; 710/23; 710/33; 710/52; 710/104; 709/301; 709/303
(58) Field of Search ............................ 710/21, 22, 23, 710/33, 52, 104; 709/301, 303

(56) References Cited

U.S. PATENT DOCUMENTS

| | | | |
|---|---|---|---|
| 5,257,368 | 10/1993 | Benson et al. ............................ | 707/1 |
| 5,257,379 | 10/1993 | Cwiakala et al. ........................ | 713/1 |
| 5,307,491 | * 4/1994 | Feriozi et al. ........................... | 709/301 |
| 5,519,870 | 5/1996 | Kannan et al. .......................... | 709/301 |
| 5,574,915 | 11/1996 | Lemon et al. ........................... | 712/220 |
| 5,675,748 | 10/1997 | Ross .......................................... | 710/104 |
| 5,689,702 | 11/1997 | Bulusu ..................................... | 707/100 |
| 5,715,456 | 2/1998 | Bennett et al. .......................... | 713/2 |
| 5,727,212 | 3/1998 | Dinallo .................................... | 709/301 |
| 5,734,852 | 3/1998 | Zias et al. ............................... | 345/334 |
| 5,745,762 | 4/1998 | Celi, Jr. et al. ......................... | 709/301 |
| 5,752,032 | * 5/1998 | Keller et al. ........................... | 709/301 |
| 5,778,226 | * 7/1998 | Adams et al. .......................... | 709/301 |
| 5,860,130 | * 1/1999 | Yamanaka et al. ................... | 711/169 |
| 6,081,854 | * 6/2000 | Priem et al. ............................ | 710/37 |
| 6,092,124 | * 7/2000 | Priem et al. ............................ | 710/23 |

* cited by examiner

*Primary Examiner*—Thomas Lee
*Assistant Examiner*—Tammara Peyton

(57) ABSTRACT

A set of registers are provided for a protocol engine driving I/O transactions requested by a host. A fixed set of defined data elements are determined for the protocol under which the I/O transaction is to be performed. Each register maps to a data structure base address or to a different data element offset or byte count. During initialization, the registers are programmed by an operating system device driver with offsets from a base address and byte counts for each data element within the defined set as those data elements are found within an operating system specific data structure for the I/O transaction, although data elements having a fixed size for each operating system may not require the byte count to be specified. For each I/O transaction requested, the base address in the host memory of the operating system specific data structure is programmed by the device driver into a register. The I/O protocol engine utilizes the base address together with the offset and byte count information to commence the requested I/O transaction. The base address is programmed by the device driver into the appropriate register on an each I/O basis, without requiring translation of the entire data structure. By permitting the hardware to be configured to effectively utilize the operating system data structure, the need for data structure translation is eliminated, CPU utilization is reduced, and increased I/O throughput is achieved.

21 Claims, 3 Drawing Sheets

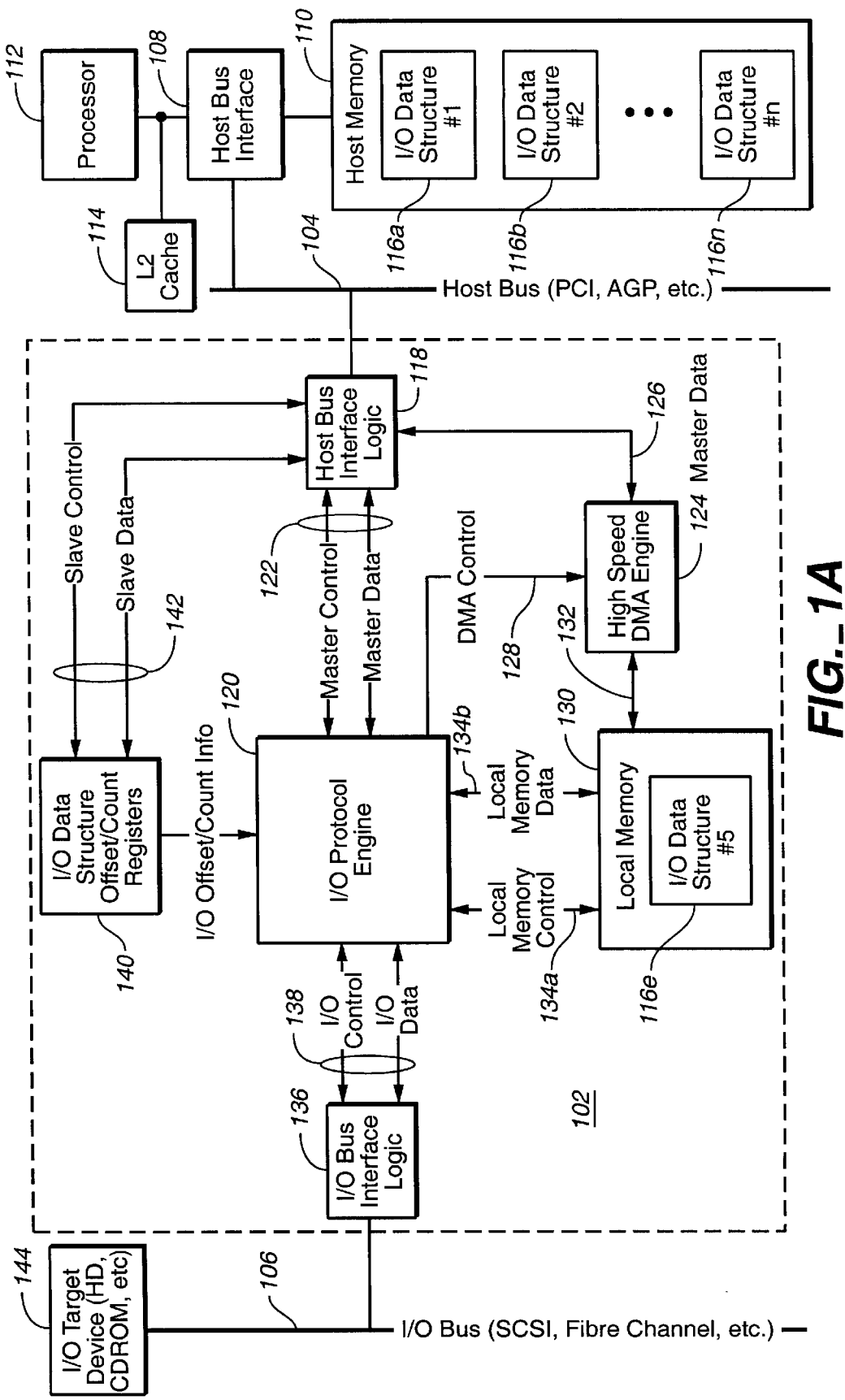
FIG._1A

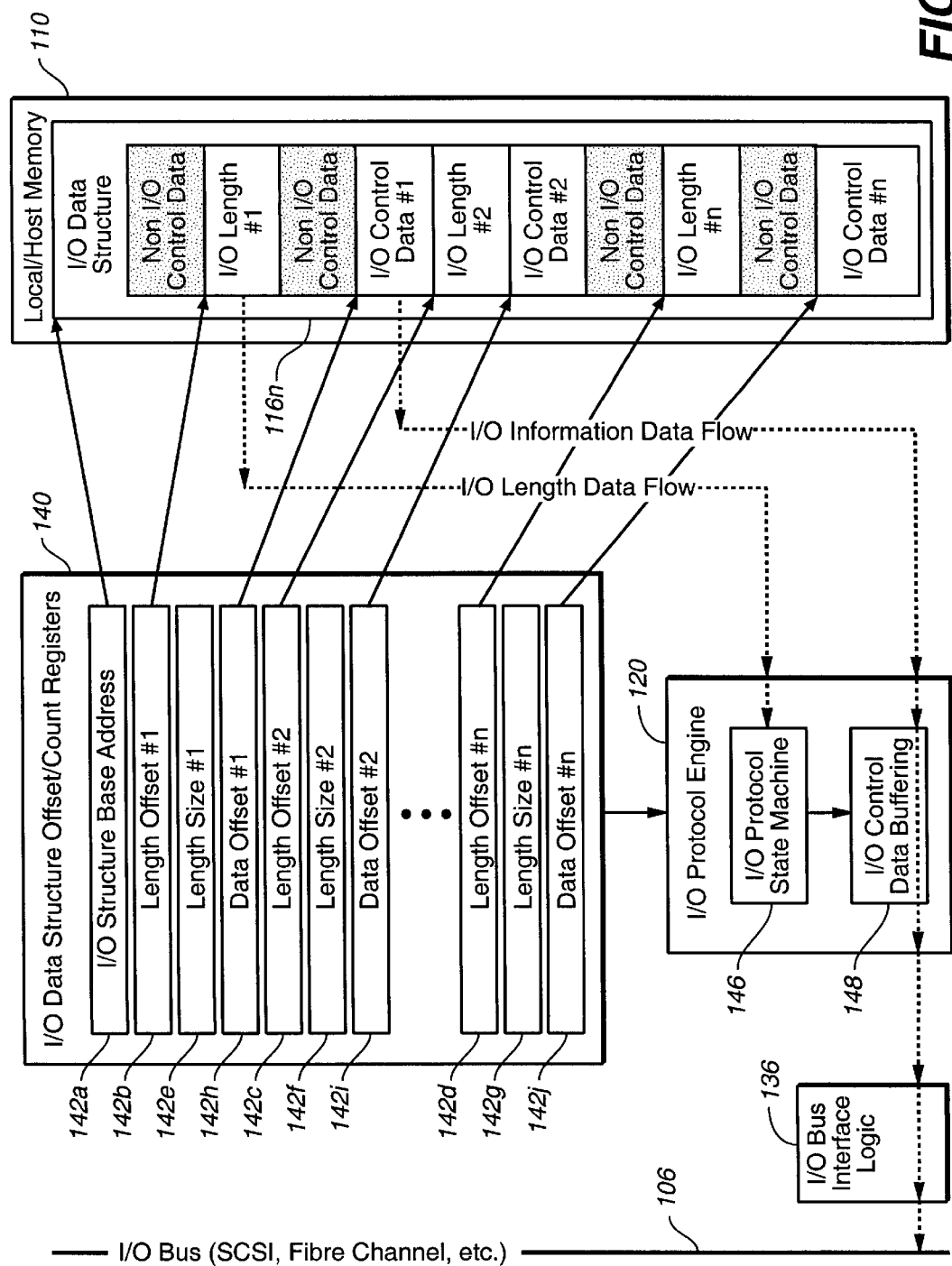
FIG._1B

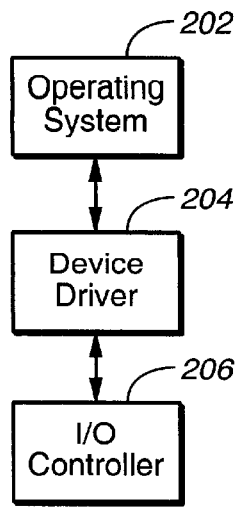
FIG._2A
(PRIOR ART)
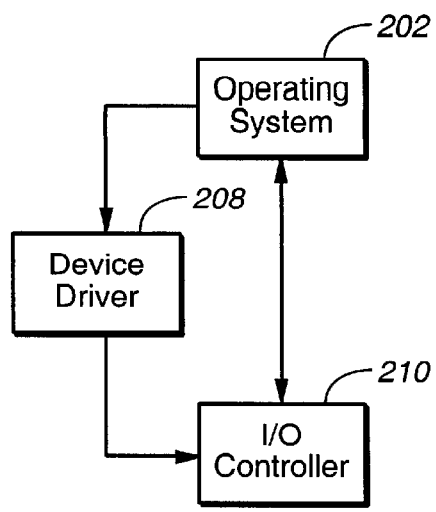
FIG._2B
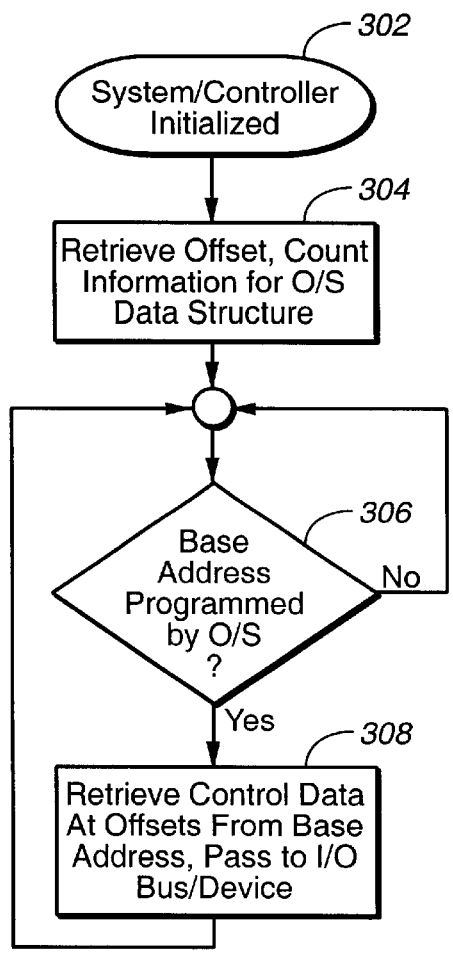
FIG._3

METHOD TO ALLOW HARDWARE CONFIGURABLE DATA STRUCTURES

BACKGROUND OF THE INVENTION

1. Technical Field

The present invention relates generally to interaction between data processing system operating systems and in particular to input/output data transactions between an operating system and storage hardware within a data processing system. Still more particularly, the present invention relates to software configuration of hardware to conform to different operating system data structures for input/output transactions.

2. Description of the Related Art

Every operating system employs a different data structure to represent an input/output (I/O) request to an independent, standard architecture I/O subsystem such as Small Computer Serial Interface (SCSI), Peripheral Component Interconnect (PCI), fiber channel and the like. However, each data structure typically contains common data for a given I/O class, varying only in organization. For example, all SCSI I/O requests include a SCSI Command Descriptor Block (CDB), a target identifier (ID) and Logical Unit Number (LUN), a scatter/gather list for data transfer, etc.

For example, the SCSI data structures employed by the Windows NT™ operating system available from Microsoft Corporation of Redmond Washington includes an I/O request ("SCSI_REQUEST_BLOCK") data structure defined as follows:

```
typedef struct_SCSI_REQUEST_BLOCK {        /* Offset */
    USHORT Length;                          /* 0x00 */
    UCHAR Function;                         /* 0x02 */
    UCHAR SrbStatus;                        /* 0x03 */
    UCHAR ScsiStatus;                       /* 0x04 */
    UCHAR PathId;                           /* 0x05 */
    UCHAR TargetId;                         /* 0x06 */
    UCHAR Lun;                              /* 0x07 */
    UCHAR QueueTag;                         /* 0x08 */
    UCHAR QueueAction;                      /* 0x09 */
    UCHAR CdbLength;                        /* 0x0A */
    UCHAR SenseInfoBufferLength;            /* 0x0B */
    ULONG SrbFlags;                         /* 0x0C */
    ULONG DataTransferLength;               /* 0x10 */
    ULONG TimeOutValue;                     /* 0x14 */
    PVOID DataBuffer;                       /* 0x18 */
    PVOID SenseInfoBuffer;                  /* 0x1C */
    struct_SCSI_REQUEST_BLOCK *NextSrb;     /* 0x20 */
    PVOID OriginalRequest;                  /* 0x24 */
    PVOID SrbExtension;                     /* 0x28 */
    ULONG QueueSortKey;                     /* 0x2C */
    UCHAR Cdb[16];                          /* 0x30 */
} SCSI_REQUEST_BLOCK, *PSCSI_REQUEST_BLOCK;
```

The data structure above has been annotated with the offsets employed by the operating system in order to make the data more understandable. The offsets given are from the beginning of the data structure and are expressed in hexadecimal.

A corresponding device data structure for a SCSI controller available from LSI Logic, Inc. of Milpitas, Calif. is as follows:

```
typedef struct_SVDT                                              /* Offset */
{
    SVDT_CONTEXT              Context;                           /* 0x00 */
    SALI_UINT32               CumulativeByteCount;               /* 0x04 */
    SALI_UINT32               PhyPtrDataMove;                    /* 0x08 */
    SALI_UINT32               SavedDataPointer;                  /* 0x0C */
    SALI_UINT32               Reserved;                          /* 0x10 */
    SALI_UINT8                TargetId;                          /* 0x14 */
    SALI_UINT8                TargetLun;                         /* 0x15 */
    SALI_UINT8                DwtFlags;                          /* 0x16 */
    SALI_UINT8                ReservedFlag;                      /* 0x17 */
    DSA_TABLE_SELECTION_ENTRY DeviceDescriptor;                  /* 0x18 */
        SALI_UINT8            Reserved1;                         /* 0x18 */
        SALI_UINT8            Sxfer;                             /* 0x19 */
        SALI_UINT8            TargetId;                          /* 0x1A */
        SALI_UINT8            Scnt13;                            /* 0x1B */
    DSA_TABLE_MOVE_ENTRY      MsgOutBufDescriptor;               /* 0x20 */
        SALI_UINT32           ByteCount;                         /* 0x20 */
        SALI_PHYSCIAL_ADDRESS PhyPtrBuffer;                      /* 0x24 */
    DSA_TABLE_MOVE_ENTRY      CdbBufDescriptor;                  /* 0x28 */
        SALI_UINT32           ByteCount;                         /* 0x28 */
        SALI_PHYSCIAL_ADDRESS PhyPtrBuffer;                      /* 0x2C */
    DSA_TABLE_MOVE_ENTRY      StatusBufDescriptor;               /* 0x30 */
        SALI_UINT32           ByteCount;                         /* 0x30 */
        SALI_PHYSCIAL_ADDRESS PhyPtrBuffer;                      /* 0x3C */
} SVDT, * PTR_SVDT;
```

The differences between the operating system data structure and the hardware data structure must be resolved in order for the operating system to perform I/O transactions with the hardware. Normally, software drivers for an I/O sub-system running within the operating system will translate the operating system data structure for I/O transactions from the operating system format to a hardware specific format. Data within the I/O transaction data structure is rearranged to be understandable to the I/O subsystem hardware.

For instance, in order to allow the Windows operating system to perform I/O operations with the LSI Logic SCSI controller with the above-described data structures, the operating system device driver must copy the request data from the NT data structure SCSI_REQUEST_BLOCK to the LSI Logic hardware data structure SVDT. The data copied in this example might include:

| Source data | Destination data |
| --- | --- |
| ScsiStatus | StatusBufDescriptor.PhyPtrBuffer address |
| TargetId | DeviceDescriptor.TargetId |
| Lun | to Message out buffer byte 0 |
| QueueTag | to Message out buffer byte 2 |
| QueueAction | to Message out buffer byte 1 |
| CdbLength | CdbBufDescriptor.ByteCount |
| SrbFlags | DwtFlags |
| DataTransferLength | CumulativeByteCount |
| DataBuffer | PhyPtrDataMove |
| Cdb [16] | CdbBufDescriptor.PhyPtrBuffer address |

This software translation is a time consuming process requiring significant processor and system resources to be expended. Translation is required only because the hardware and operating system data structures are incongruent and the hardware cannot be configured to directly understand the operating system data structure. The requirement for data structure translation compels processor utilization for I/O transactions and poses a limiting factor on I/O throughput.

It would be desirable, therefore, to eliminate the overhead required for translation of I/O transaction data structures during operation of a data processing system. It would further be advantageous for the mechanism eliminating the translation overhead to remain capable of configuration for compatibility with various hardware data structures for a given I/O architecture.

SUMMARY OF THE INVENTION

A set of registers are provided for a protocol engine driving I/O transactions requested by a host. A fixed set of defined data elements are determined for the protocol under which the I/O transaction is to be performed. Each register maps to a data structure base address or to a different data element offset or byte count. During initialization, the registers are programmed by an operating system device driver with offsets from a base address and byte counts for each data element within the defined set as those data elements are found within an operating system specific data structure for the I/O transaction, although data elements having a fixed size for each operating system may not require the byte count to be specified. For each I/O transaction requested, the base address in the host memory of the operating system specific data structure is programmed by the device driver into a register. The I/O protocol engine utilizes the base address together with the offset and byte count information to commence the requested I/O transaction. The base address is programmed by the device driver into the appropriate register on an each I/O basis, without requiring translation of the entire data structure. By permitting the hardware to be configured to effectively utilize the operating system data structure, the need for data structure translation is eliminated, CPU utilization is reduced, and increased I/O throughput is achieved.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 1A and 1B depict a block diagram and data flow diagram for programmable I/O offset/byte count implementation in accordance with a preferred embodiment of the present invention;

FIGS. 2A–2B are comparative logical block diagrams of the interaction between an operating system, a device driver, and an I/O controller in accordance with the prior art and the present invention; and FIG. 3 depicts a high level flowchart for a process of utilizing hardware configurable data structures in accordance with a preferred embodiment of the present invention.

DETAILED DESCRIPTION

With reference now to the figures, and in particular with reference to FIG. 1A and 1B, a block diagram and data flow diagram for a programmable I/O offset/byte count implementation in accordance with a preferred embodiment of the present invention is depicted. FIG. 1A depicts a block diagram for the programmable I/O offset/byte count mechanism 102, which may be implemented between two buses within a data processing system, forming part of a bus bridge, for example, between a host bus 104 and an I/O bus 106. Host bus 104 may be a system bus conforming to the Peripheral Component Interconnect (PCI) standard, the Accelerated Graphics Port (AGP) standard, or the like. A host bus interface unit 108 connected to host bus 104 couples system or host memory 110, processor 112, and level two (L2) cache 114 to host bus 104. Memory 110 contains various operating system I/O data structures 116a–116n for I/O requests to different devices connected or coupled to host bus 104.

Programmable I/O offset/byte count mechanism 102 includes host bus interface logic 118 buffering data transfers to and from host bus 104 and implementing control logic for such data transfers. An I/O protocol engine 120 implements logic for performing I/O transactions processed by programmable I/O offset/byte count mechanism 102 and exchanges master control and master data signals with host bus interface logic 118 on signal lines 122. Master data signals are also exchanged between host bus interface logic 118 and high speed direct memory access (DMA) unit 124 on conductors 126.

I/O protocol engine 120 is also connected to DMA unit 124 and transmits DMA control signals to DMA unit 124 on conductor(s) 128. I/O protocol engine 120 and DMA unit 124 are both connected to local memory 130; DMA unit 124 exchanges data signals with local memory 130 on conductor (s) 132 while I/O protocol engine 120 exchanges local memory control and local memory data signals with local memory 130 on conductors 134a and 134b, respectively.

I/O protocol engine 120 is also connected to I/O bus interface logic 136, which couples programmable I/O offset/byte count mechanism 102 to I/O bus 106. I/O bus 106 may be a bus conforming to the Small Computer Serial Interface (SCSI) standard, the fibre channel standard, or the like, and is connected to a storage device 144 containing data which is the subject of I/O transactions, which may be a hard disk drive, a compact disk read-only memory (CDROM), or the like. I/O bus interface logic 136 exchanges I/O control and I/O data signals from I/O protocol engine 120 on conductors 138.

I/O protocol engine 120 is connected to I/O data structure offset/count register unit 140, and receives I/O offset/count information from register unit 140. Registers within register unit 140 may be programmed with the offsets and sizes of data modules within the I/O data structure employed by the operating system for I/O requests on a particular bus architecture. Register unit 140 exchanges slave control and slave data signals with host bus interface logic 118 on conductors 142.

Local memory 130 contains a copy of an I/O data structure 116e within operating system I/O data structures 116a–116n. The I/O data structure 116e within local memory 130 is the I/O data structure employed by the operating system for the I/O protocol to which programmable I/O offset/byte count mechanism 102 conforms. The I/O data structure 116e is employed by I/O protocol engine 120 to handle I/O requests received from host bus 104. The offsets and sizes contained within the registers of register unit 140 define the location and length within I/O data structure 116e of the parameters required to process I/O requests.

Programmable I/O offset/byte count mechanism 102 may thus be programmed to utilize any data structure for receiving the parameters of an I/O request by programming the registers in register unit 140 with the appropriate offset from the base address of the data structure to a given parameter and amount of data within the data structure which comprises that parameter. In order for the hardware to be programmed to directly understand any operating system data structure in this manner, however, the set of data which is required and understood by the hardware should be fixed and known.

Strictly by way of example, if I/O bus 106 is a SCSI bus, a small set of data which is required to be known by the hardware for a SCSI controller including programmable I/O offset/byte count mechanism 102 may be defined:

SCSI Message Out Length
SCSI Message Out data
SCSI CBD Length
SCSI CBD data
SCSI Target LUN
SCSI Target ID The data defined above is intended to be merely representative and does not necessarily contain all of the data required for an actual SCSI operation. With these data items defined, a programmable I/O offset/byte count mechanism 102 is configured with nine registers:

(A) SCSI Message Out Length offset from base address
(B) SCSI Message Out Length size
(C) SCSI Message Out data offset from base address
(D) SCSI CBD Length offset from base address
(E) SCSI CBD Length size
(F) SCSI CBD data offset from base address
(G) SCSI Target LUN offset from base address
(H) SCSI Target ID
(I) Base address of operating system data structure These nine registers within register unit 140 thus contain the base address of where the location of the operating system data structure resides in memory, as well as the offset from the base address and the size of each required data item. The "size" registers in the example given—(B) and (E)—each contain a number of bytes (e.g., 1, 2, or 4) utilized to represent the length of the corresponding parameter. This is only required where the size of a parameter is selectively variable. Note, for example, that no size was specified for the target LUN and target ID parameters, which each may be fixed at 1 byte.

When a first operating system is running on the host system, a device driver for that operating system programs registers (A) through (H) with offsets and lengths representing the actual data structure employed by the first operating system during initialization, then programs the base address of the I/O request to be executed by programmable I/O offset/byte count mechanism 102 in register (I). Register (I) is reprogrammed on every I/O request.

To illustrate, an exemplary C data structure for I/O requests employed by the first operating system is specified:

```
struct_OS_1_DATA
    {                                       /* Offset */
        UINT16    ScsiMessageOutLength;     /* 0x00 */
        UINT8     ScsiMessageOutData[16];   /* 0x02 */
        UINT32    ScsiCdbLength;            /* 0x12 */
        UINT8     ScsiCdbData[32];          /* 0x16 */
        UINT8     ScsiTargetLun;            /* 0x36 */
        UINT8     ScsiTargetId;             /* 0x37 */
    } OS_1_DATA;
```

The offsets of each element are assumed to be as shown, and "UNITn" is an n-bit value.

To employ programmable I/O offset/byte count mechanism 102, the device driver for the first operating system then programs the registers defined above as follows:

| Register | Value |
|---|---|
| (A) | 0x00 (offset of Message Out Length) |
| (B) | 0002 (size of Message Out Length in bytes, 2 bytes = 16 bits) |
| (C) | 0x02 (offset of Message Out data) |
| (D) | 0x12 (offset of CDB Length) |
| (E) | 0004 (size of CBD Length in bytes, 4 bytes = 32 bits) |
| (F) | 0x16 (offset of CBD data) |
| (G) | 0x36 (offset of Target LUN) |
| (H) | 0x37 (offset of Target ID) |

When the first operating system issues an I/O request, the device driver programs register (I) with the base address for the operating system data structure formatted in accordance with OS_1_DATA which corresponds to that request. This is performed for each I/O request to be executed.

A second C data structure for I/O requests employed by a second operating system may also be specified:

```
struct_OS_2_DATA
    {                                       /* Offset */
        UINT8     ScsiTargetId;             /* 0x00 */
        UINT8     ScsiTargetLun;.           /* 0x01 */
        UINT8     ScsiMessageOutLength;     /* 0x02 */
        UINT8     ScsiCdbLength;            /* 0x03 */
        UINT32    MiscUnknownData;          /* 0x04 */
        UINT8     ScsiMessageOutData[16];   /* 0x08 */
        UINT32    MiscUnknownData2[2];      /* 0x18 */
        UINT8     ScsiCdbData[32];          /* 0x20 */
    } OS_2_DATA;
```

This example assumes that there is unknown or operating system-specific data residing within the data structure utilized by the operating system device driver which is other than the set required by the hardware.

The device driver for the second operating system would then programs the registers within register unit 140 of programmable I/O offset/byte count mechanism 102 as follows:

| Register | Value |
|---|---|
| (A) | 0x02 (offset of Message Out Length) |
| (B) | 0001 (size of Message Out Length in bytes, 1 byte = 8 bits) |
| (C) | 0x08 (offset of Message Out data) |

-continued

| Register | Value |
|---|---|
| (D) | 0x03 (offset of CDB Length) |
| (E) | 0001 (size of CBD Length in bytes, 1 byte = 8 bits) |
| (F) | 0x20 (offset of CBD data) |
| (G) | 0x01 (offset of Target LUN) |
| (H) | 0x00 (offset of Target ID) |

When the second operating system issues an I/O request, the device driver for the second operating system programs the base address of the operating system data structure for the request, formatted in accordance with OS_2_DATA, in register (I). The device driver programs register (I) for every I/O to be executed, just as with the first operating system.

For the specific example of the NT data structure SCSI_REQUEST_BLOCK and the corresponding LSI Logic hardware data structure SVDT described earlier, registers (A) through (I) defined above would be programmed as follows:

| Register | Value |
|---|---|
| (A) | 0x40 |
| (B) | 0001 |
| (C) | 0x41 |
| (D) | 0x0A (offset of CdbLength element in SCSI_REQUEST_BLOCK) |
| (E) | 0001 (size of CdbLength element in SCSI_REQUEST BLOCK) |
| (F) | 0x30 (offset of Cdb[] element in SCSI_REQUEST_BLOCK) |
| (G) | 0x07 (offset of Lun element in SCSI_REQUEST_BLOCK) |
| (H) | 0x06 (offset of TargetId element in SCSI_REQUEST_BLOCK) |

When the Windows NT operating system driver wishes to start the I/O, it programs the address of SCSI_REQUEST_BLOCK into register (I). From there, the hardware determines what to do and where to obtain the requested data.

FIG. 1B depicts a data flow diagram for the programmable I/O offset/byte count mechanism of the present invention. Data elements for an I/O transaction on I/O bus 106 originate within host memory 110 in an operating system-specific I/O data structure 112n for the I/O transaction. The base address of I/O data structure 112n is specified in one register within register unit 140, and the offset and byte count of each relevant I/O message within I/O data structure 116n are also specified in a register within register unit 140.

Only messages which are required by the hardware for control of the requested I/O transaction need be delimited by offset and count information. Furthermore, count information is only required for those messages which may have variable length, either from one I/O transaction to another or from one operating system to another.

I/O protocol engine 120 then extracts the information required to perform the requested I/O transaction from the I/O data structure 116n utilizing the offset/count contents of registers within register unit 140. Messages extracted from I/O data structure 116n are forwarded to I/O bus 106. A register 142a within register unit 140 contains the base address for I/O data structure 116n within host memory 110. For each I/O request element having a variable length, a register 142b, 142c, or 142d contains the offset within the I/O data structure 116n from the base address to the data comprising the length of the corresponding I/O request element and another register 142e, 142f, or 142g contains the size of the length data (e.g., in bytes) at the specified offset. For each I/O request control data element, a register 142h, 142i, or 142j contains the offset to the corresponding data for the I/O request control data.

The length information within data structure 116n identified by pointers (offsets) and byte counts (size) contained within registers 142b/142e, 142c/142f, or 142d/142g is employed by I/O protocol state machine 146 within I/O protocol engine 120 to configure I/O control data buffering 148 for I/O requests. I/O control data contained within registers 142h, 142i, or 142j is passed via I/O control data buffering 148 within I/O protocol engine 120 to I/O bus interface logic 136 and from there to I/O bus 106. I/O devices attached to I/O bus 106 may then perform the requested I/O operation.

For the generic example described above (OS_1_DATA), register 142b may contain the offset of Message Out Length while register 142e contains the size of Message Out Length in bytes and register 142h contains the offset of Message Out data. Similarly, register 142c may contain the offset of CDB Length while register 142f contains the size of CBD Length in bytes and register 142i contains the offset of CBD data. Register 142j may contain the offset of Target LUN, with register 142d (the corresponding length offset) and register 142g (the corresponding length size) being empty since the Target LUN has a fixed size. The Target ID would be contained within an additional register (not shown), with the corresponding length and offset registers also being empty since the Target ID has a fixed size. The base address of a data structure for each new I/O request would be written to register 142a.

Referring to FIGS. 2A and 2B, comparative logical block diagrams of the interaction between an operating system, a device driver, and an I/O controller in accordance with the prior art and the present invention are illustrated. FIG. 2A illustrates the interaction between an operating system, a device driver, and an I/O controller in accordance with the known art. A device driver 204 interposed between operating system 202 and I/O controller 206 translates I/O transaction data structures.

In the present invention, illustrated in FIG. 2B, device driver 208 merely sets up I/O controller 210 to interact directly with operating system 202 during system initialization. Thereafter operating system 202 and I/O controller 210 interact directly with each other. Thus, device driver 208 is different from device driver 204, and serves a different function. I/O controller 210 also differs from I/O controller 206, including registers as described above for the offset and count information necessary to adopt the data structure employed by operating system 202 for I/O requests.

With reference now to FIG. 3, a high level flowchart for a process of utilizing hardware configurable data structures in accordance with a preferred embodiment of the present invention is depicted. The process begins at step 302, which depicts initialization of the system and/or controller. The process then passes to step 304, which illustrates the device driver programs the operating system data structure offset and count information into the registers of the controller as part of the system initialization.

The process next passes to step 306, which depicts a determination of whether a new base address has been written into the corresponding controller register by the operating system. To initiate an new I/O request, the operating system writes a new base address for a data structure conforming to the structure programmed into an appropriate register within the controller. Upon detecting a new base address being written to the base address register, the process proceeds to step 308, which illustrates the controller retrieving the data structure at that base address from the host memory and processing the I/O request, passing the requisite control data for the request to the I/O bus or device.

If no new base address has been programmed into the appropriate register within the controller, the process returns to step 306 to continue polling for a new base address. Similarly, after processing an I/O request initiated by a new base address being written into the base address register, the process returns to 306 to resume polling for the next base address to be written. The process thus continues until interrupted by an external process.

With the present invention, the operating system device driver no longer needs to copy data from the operating system data structure to a hardware proprietary data structure. Instead, the operating system device driver may effectively program the hardware to alter its data structure to match the operating system data structure. The operating system data structure may then be utilized directly by the hardware.

The principle underlying the present invention may be extended to make any I/O data structure shared between the operating system and hardware congruent, even if the operating system does not provide all of the data required by the hardware. In that circumstance, the operating system device driver could merely append the required data not supplied by the operating system to the data structure which is supplied by the operating system.

The present invention may also be implemented in intelligent firmware for a controller, eliminating the requirement for hardware specific registers. In such an embodiment, the firmware would merely emulate the model of the present invention provided as an example, being programmed by the operating system device driver with the offsets and sizes of the I/O transaction parameters as described above. The firmware would then provide the necessary translation for the underlying hardware, which allows just as much configuration ability but does not require hardware register support.

The present invention permits configuration of hardware controllers to be able to understand different operating system data structure without requiring direct software translation of each data structure. In this manner, CPU utilization is reduced and increased I/O throughput may be realized.

It is important to note that while the present invention has been described in the context of a fully functional system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of employing hardware configurable data structures for an I/O transaction, comprising:

storing offset and count information for an operating system data structure configuration employed in the I/O transaction within a plurality of storage locations;

monitoring a base address storage location for a write of a base address to the base address storage location;

responsive to detecting a write of a base address to the base address storage location, retrieving a data structure at the base address; and determining message data necessary to process the I/O transaction from the retrieved data structure utilizing the offset and count information.

2. The method of claim 1, wherein the step of storing offset and count information for a data structure employed in the I/O transaction within a plurality of storage locations further comprises:

storing a data offset for each parameter within the data structure.

3. The method of claim 1, wherein the step of storing offset and count information for a data structure employed in the I/O transaction within a plurality of storage locations further comprises:

storing a length offset and a length size for each parameter within the data structure.

4. The method of claim 1, wherein the step of storing offset and count information for a data structure employed in the I/O transaction within a plurality of storage locations further comprises:

storing a SCSI message out length offset, a SCSI message out length size, and a SCSI message out data offset within a first group of registers within the plurality of storage locations;

storing a SCSI command descriptor block length offset, a SCSI command descriptor block length size, and a SCSI command descriptor block data offset within a second group of registers within the plurality of storage locations;

storing a SCSI target LUN and ID within a third group of registers within the plurality of storage locations.

5. The method of claim 1, wherein the step of retrieving a data structure at the base address further comprises:

retrieving a data structure at the base address from a host memory.

6. The method of claim 1, wherein the step of determining message data necessary to process the I/O transaction from the retrieved data structure utilizing the offset and count information further comprises:

determining a message data content and a corresponding message data size utilizing the offset and count information.

7. The method of claim 1, wherein the step of determining a message data contents and a corresponding message data size utilizing the offset and count information further comprises:

reading a SCSI message out length from the retrieved data structure utilizing the offset and count information;

reading a SCSI message out contents from the retrieved data structure utilizing the offset and count information;

reading a SCSI command descriptor block length from the retrieved data structure utilizing the offset and count information;

reading a SCSI command descriptor block contents from the retrieved data structure utilizing the offset and count information;

reading a SCSI target LUN from the retrieved data structure utilizing the offset and count information; and reading a SCSI target ID from the retrieved data structure utilizing the offset and count information.

8. The method of claim 1, further comprising:

transmitting the message data necessary to process the I/O transaction to an I/O device.

9. A method of handling an I/O request, comprising:

receiving a base address for a location within a host memory of an operating system data structure for the I/O request;

retrieving the operating system data structure from the location identified by the base address;

utilizing offset and count information defining a configuration of the operating system data structure to identify message data within the operating system data structure which is necessary to process the I/O request; and transmitting the identified message data to an I/O device.

10. The method of claim 9, wherein the step of utilizing offset and count information defining a configuration of the operating system data structure to identify message data within the operating system data structure which is necessary to process the I/O request further comprises:

utilizing the offset and count information to determine a message length offset, and message length size, and a message data offset for each message element forming the I/O request.

11. The method of claim 10, wherein the step of utilizing the offset and count information to determine a message length offset, and message length size, and a message data offset for each message element forming the I/O request further comprises:

determining a SCSI message out length offset, a SCSI message out data offset, a SCSI command descriptor block length offset, a SCSI command descriptor block length size, a SCSI command descriptor block data offset, a SCSI target LUN, and a SCSI target ID from the retrieved data structure utilizing the offset and count information.

12. An I/O control system, comprising:

a plurality of storage locations containing offset and count information for an operating system data structure configuration employed in I/O transactions involving the I/O control system;

a base address storage location containing a base address for a operating system data structure for an I/O transaction;

a I/O engine connected to the plurality of storage locations and the base address storage location, the I/O engine:

monitoring the base address storage location;

retrieving the data structure in response to detecting a base address being written to the base address storage location; and determining message data necessary to process the I/O transaction from the retrieved data structure utilizing the offset and count information.

13. The I/O control system of claim 12, wherein the plurality of storage locations and the base address storage location comprise registers.

14. The I/O control system of claim 12, wherein the plurality of storage locations and the base address storage location comprise firmware storage locations.

15. The I/O control system of claim 12, further comprising:

a host memory coupled to the I/O engine and containing the operating system data structure;

a processor coupled to the I/O engine and executing a device driver process loading the offset and count information into the plurality of storage locations; and an I/O device coupled to the I/O engine and containing data which is the subject of the I/O transaction.

16. The I/O control system of claim 15, further comprising:

a first bus interface unit connected between the host memory and the I/O engine and between the processor and the I/O engine;

a second bus interface unit connected between the I/O device and the I/O engine;

a local memory connected to the I/O engine in which the retrieved data structure is stored; and a DMA engine connected to the first bus interface unit, the local memory, and the I/O engine for retrieving the data structure from the base address.

17. The I/O control system of claim 15, wherein the plurality of storage locations contain:

a SCSI message out length offset, a SCSI message out length size, a SCSI message out data offset, a SCSI command descriptor block length offset, a SCSI command descriptor block length size, a SCSI command descriptor block data offset, a SCSI target LUN, and a SCSI target ID.

18. The I/O control system of claim 15, wherein the base address storage location contains:

a host memory address for the operating system data structure.

19. A computer program product within a computer usable medium for handling an I/O request, comprising:

instructions for receiving a base address for a location within a host memory of an operating system data structure for the I/O request;

instructions for retrieving the operating system data structure from the location identified by the base address;

instructions for utilizing offset and count information defining a configuration of the operating system data structure to identify message data within the operating system data structure which is necessary to process the I/O request; and instructions for transmitting the identified message data to an I/O device.

20. The computer program product of claim 19, wherein the instructions for utilizing offset and count information defining a configuration of the operating system data structure to identify message data within the operating system data structure which is necessary to process the I/O request further comprise:

instructions for determining a SCSI message out length from the retrieved operating system data structure utilizing a SCSI message out length offset and a SCSI message out length size within the offset and count information;

instructions for determining a SCSI message out contents from the retrieved operating system data structure utilizing a SCSI message out data offset within the offset and count information;

instructions for determining a SCSI command descriptor block length from the retrieved operating system data structure utilizing a SCSI command descriptor block length offset and a SCSI command descriptor block length size within the offset and count information;

instructions for determining a SCSI command descriptor block contents from the retrieved operating system data structure utilizing a SCSI command descriptor block data offset within the offset and count information;

instructions for determining a SCSI target LUN from the retrieved operating system data structure utilizing a SCSI target LUN offset within the offset and count information; and instructions for determining a SCSI target ID from the retrieved operating system data structure utilizing a SCSI target ID offset within the offset and count information.

21. The computer program product of claim 20, wherein the instructions for transmitting the identified message data to an I/O device further comprise:

instructions for transmitting the SCSI message out length, the SCSI message out contents, the SCSI command descriptor block length, the SCSI command descriptor block contents, the SCSI target LUN and the SCSI target ID to the I/O device.

* * * * *